(No Model.)
H. WHITAKER.
FISHING ROD.
No. 486,802. Patented Nov. 22, 1892.
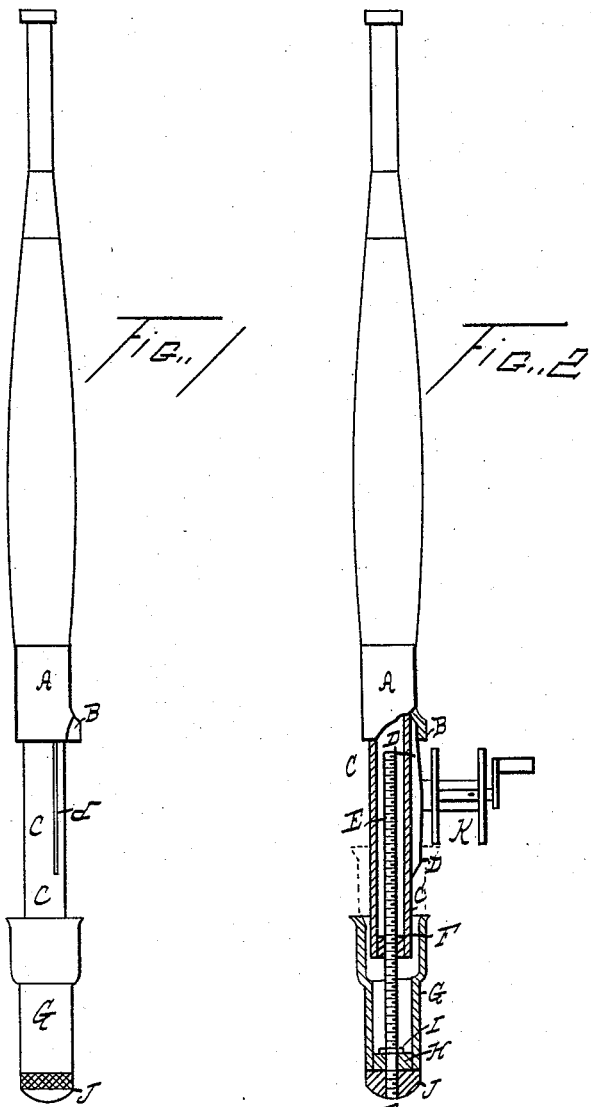
Witnesses
Thomas G. Kennedy
Gertrude H. Anderson
Inventor
H. Whitaker

UNITED STATES PATENT OFFICE.

HERSCHEL WHITAKER, OF DETROIT, MICHIGAN.

FISHING-ROD.

SPECIFICATION forming part of Letters Patent No. 486,802, dated November 22, 1892.

Application filed March 19, 1892. Serial No. 425,618. (No model.)

*To all whom it may concern:*

Be it known that I, HERSCHEL WHITAKER, of Detroit, in the county of Wayne and State of Michigan, have invented a new and useful Improvement in Fishing-Rods, of which the following is a specification.

My invention consists in an improvement in fishing-rods, hereinafter fully described and claimed.

Figure 1 is an elevation of the butt-joint of the rod with my improvement applied thereto. Fig. 2 is a similar view, partly in section, and with the reel placed on the reel-seat.

A represents the butt-joint of a fishing-rod, and C represents the reel-seat, having thereon the two ordinary ribs d to prevent lateral motion of the reel.

B represents a fixed clip at one end of the reel-seat, instead of the movable ring ordinarily used.

F represents a screw-threaded plug which closes the end of the reel-seat C.

K represents a reel having the ordinary base D, adapted to fit under clip B.

G represents a ferrule, whose inner end is adapted to fit over the end of base D.

H represents a plug, which closes one end of ferrule G.

J represents a thumb-screw, preferably milled on its periphery, as shown in Fig. 1, in which is secured a screw-threaded rod or shaft E, supported and carried by the plug F of the fishing-rod, said screw rod or shaft passing loosely through plug H and has a collar I secured to it on the inner side of said plug, so that said screw-shaft E will carry ferrule G longitudinally with it, but is free to rotate without rotating ferrule G. Ferrule G may be formed so that any part of its inner periphery will receive the end of base D of the reel, or it may be formed with a swell in one part only, as indicated in Fig. 2. Screw-shaft E is adapted to engage with the threaded hole in plug F and to extend into the hollow reel-seat C.

The operation of the invention is as follows: By rotating the thumb-screw J ferrule G is moved away from clip B far enough to permit the ready insertion of base D of the reel K under clip B. By then rotating thumb-screw J in the opposite direction screw-shaft E enters plug F and carries ferrule G over the rear end of base D, thus holding reel K firmly in position. This provides a reel-fastening which holds the reel with great power to its seat and which is not liable to permit the reel to become loose when the rod is in motion in the act of fishing.

What I claim as my invention, and desire to secure by Letters Patent, is—

The combination, with the reel-seat of a fishing-rod, a stationary clip at one end of the reel-seat, and a movable ferrule or clip at the other end thereof, of a screw-threaded plug F, arranged at one end of the reel-seat, and a rotating screw-shaft E, engaging the screw-threaded plug and connected with the movable ferrule or clip, so that by rotating the screw-shaft the movable ferrule or clip is adjusted toward or from the stationary clip, substantially as described.

HERSCHEL WHITAKER.

Witnesses:
THOMAS G. KENNEDY,
GERTRUDE H. ANDERSON.